United States Patent [19]
Glück et al.

[11] 3,899,850
[45] Aug. 19, 1975

[54] CARRIER BODIES FOR PLANTS

[75] Inventors: Maternus Glück, Linz-Hart;
Bernhard Eder; Walter Kriegner,
both of Linz, all of Austria

[73] Assignee: Semperit AG, Vienna, Austria

[22] Filed: Apr. 8, 1974

[21] Appl. No.: 459,066

Related U.S. Application Data

[63] Continuation-in-part of Ser. No. 166,831, July 28, 1971, abandoned.

[52] U.S. Cl. .......................... 47/37; 260/2.5; 47/34; 47/47; 71/64 R; 47/DIG. 7
[51] Int. Cl.² ............................................ A01G 9/10
[58] Field of Search .............. 47/37, 56, 34, DIG. 7, 47/58; 71/64, 1; 260/2.5, 2.5 AD

[56] References Cited
UNITED STATES PATENTS

| | | | |
|---|---|---|---|
| 3,110,129 | 11/1963 | Baumann................................ | 47/58 |
| 3,257,754 | 6/1966 | Ohsol...................................... | 47/56 |
| 3,373,009 | 3/1968 | Pruitt et al........................ | 47/DIG. 7 |
| 3,472,644 | 10/1969 | Woodside et al................... | 47/37 X |
| 3,703,786 | 11/1972 | Swan...................................... | 47/56 |
| 3,706,678 | 12/1972 | Dietrich et al................ | 260/2.5 AD |
| 3,798,836 | 3/1974 | Rubens et al....................... | 47/37 X |
| 3,799,755 | 3/1974 | Rack................................ | 47/37 UX |
| 3,812,619 | 5/1974 | Wood et al.......................... | 47/37 X |
| 3,834,072 | 9/1974 | Rack....................................... | 47/37 |

FOREIGN PATENTS OR APPLICATIONS

| | | |
|---|---|---|
| 722,589 | 11/1965 | Canada |
| 1,252,849 | 11/1971 | United Kingdom |

*Primary Examiner*—Robert E. Bagwill
*Attorney, Agent, or Firm*—Werner W. Kleeman

[57] ABSTRACT

A carrier body for a plant, comprising a mixture of foam flakes and nutritives, said foam flakes embodying foam flakes having the majority of their pores in the form of open pores, a binding agent for binding together said foam flakes and nutritives to form a foamed body, said binding agent being water insoluble and preferably formed of a foamed material, said foamed body possessing a density value of between 60 and 200 kg per m³. There is also disclosed a method for making such carrier body comprising the steps of admixing foam flakes of synthetic material together with nutritive substances, introducing a foaming water-insoluble synthetic material under pressure to said admixture in an amount and for a time to bind together the admixed particles, and cooling the foamed admixture.

18 Claims, 7 Drawing Figures

PATENTED AUG 19 1975 3,899,850

3,899,850

CARRIER BODIES FOR PLANTS

CROSS-REFERENCE TO RELATED CASE

This application is a continuation-in-part of our commonly assigned copending United States application Ser. No. 166,831, filed July 28, 1971 now abandoned.

BACKGROUND OF THE INVENTION

The present invention relates to new and improved carrier bodies for plants, and also to a method of forming such carrier bodies.

It has already become known to the art to use various synthetic organic foam substances in agriculture, in particular in gardens, for improving the soil and for use as a plant substrate. In particular, it has been proposed to mix foam material in the form of flakes or lumps such as, for example, polyurethane foam, urea-formaldehyde resin foam, polystyrene foam and the like into the surface of the soil. Thereby the soil is aerated, the water retaining ability is improved, and a thermal insulating effect occurs, by means of which an improvement in the reservation of heat is obtained, which is especially pronounced if foam substances having closed pores are used, such as, for example, polystyrene foam.

To obtain particular effects, it has already been proposed to combine foam flakes or foam substances which are gound to powder, possibly with the addition of nutrient-and/or filler materials, with a water-soluble binding agent to form aggregates. Such aggregates sometimes can be better worked into the soil where they again decompose into their individual components.

Plant breeding, in individual containers, with a mixture of earth, porous material and fertilizers of this kind, has, however, been found to be very time-consuming and difficult. When one wishes to fill a container with a mixture of this type, it is always necessary to prepare the mixture directly beforehand, as decomposition occurs on bedding, whereby the nutrient soil for the plants becomes inhomogeneous. There exists the further drawback that when transplanting, the hair roots and also the larger roots of the plants become damaged, as the mixture clings together only loosely and can therefore fall away from the roots. The water retention properties of the plants are thereby disturbed, which leads to a large number of hair roots, which can only live in a damp atmosphere, dying off. When plants, which have been cultivated with this mixture, are changed over there is a longer cessation of growth of the plants than is desirable, as the absorption of nutrient and water is reduced by the smaller number of hair roots, and before further growth the plant must regenerate or the root stump must be reconstructed.

Therefore, it is has also been previously proposed to produce plant substrates in the form of bodies or blocks of foam, in particular polyurethane. The seeds are placed on the substrate or inserted in recesses in the foam, in which manner, in fact, cuttings or young plants also may be inserted. The roots of almost all plants can grow through these thin-walled and particularly open-pored foam substances, and the roots are nearly always well aerated and can absorb fertilizer solutions with which the foam is moistened.

With such blocks, however, it is very difficult to introduce additional or filler materials. A series of important nutrient salts can be added to the foam substance during the course of its manufacture. Frequently, however, liquid nutrient solutions disturb even more solid nutrient substrates, which can unfavorably influence the formation of foam or the hardening of the synthetic material.

SUMMARY OF THE INVENTION

Therefore, a real need still exists in the art for carrier bodies for plants which are not associated with the aforementioned drawbacks. It is a primary object of this invention to provide just such improved carrier body which substantially overcomes the aforementioned disadvantages of the prior art proposals and effectively and reliably fulfills the still existing need in the art.

Still a further significant object of the present invention relates to a new and improved carrier body for a plant which can be readily adapted to the specific type of plant with which the carrier body is intended to be used to maximize fulfillment of the requirements for effective plant growth.

Now, in order to implement these and still further objects of the invention, which will become more readily apparent as the description proceeds, the invention contemplates the provision of a carrier body for a plant which comprises a mixture of foam flakes and nutritives, bonded together by means of a non-water-soluble binding agent.

Preferably the carrier body includes filler materials and preferably also the non-water-soluble binding agent is a foamed material. Thereby a foam substance is obtained which generally possesses a relatively high degree of solidity so that manipulation is substantially simplified. The nutrient substances are preferably uniformly distributed, such that they can be gradually supplied by foam to the plants, and also easily absorbed by the latter.

If the foam substance contains a mixture of flakes of two different materials, such as, for example, a foam substance which has mainly open pores with another which has mainly closed pores, e.g. soft and hard polyurethane foam, a particularly good rooting through of the young plants is generally obtained. At the same time protection against extreme climate conditions is also usually obtained. By the selection of specific mixture rates of open-pored to closed-pored foam, the characteristics of the foam substance can normally be accurately adapted to a specific type of plant. When the percentage of open-pored foam is increased, the ventilation of the roots and the passage of water therethrough is generally improved. This is particularly important in the case of plants which have a high water requirement and are normally placed in very damp earth. After being poured on, the water can usually penetrate very rapidly into this foam, such that good watering of the plants is obtained. The foam substance, can also, for example, be placed on tubs, which tubs are then supplied with water. This water is then absorbed from the foam into the root region and substantially uniformly supplied to the roots.

In the case of a higher percentage of foam with closed pores, the heat insulation of the foam is generally increased. The depth of frost penetration is also thereby usually reduced. Plants thus normally can be inserted much less deeply in these foam substances than in normal earth. By the improvement of the reservation of heat, the growth of the young plants is generally accelerated. They also normally can be planted or set out at an earlier time of year, even in cooler temperatures. The thickness of the layer of foam usually can be made substantially smaller than the thickness of the layer of soil normally used. A further advantage of this design is that various frost-sensitive plants often can be planted in a substantially colder climate, for example, in northern regions or in higher mountainous locations.

If the foam substance contains particles of polystyrene foam, a particularly low specific weight of the foam substance is obtained, whereby manipulation is substantially simplified.

If it is wished to obtain a higher degree of solidity of the foam substance polyurethane can be used as the binding agent.

For example, 60 kg of soft polyurethane foam flakes (density 15 kg/m$^3$) are mixed with 35 kg of dried peat litter and 5 kg of fertilizer. Alternatively these last two materials may be fed directly into the mixing device provided for introducing the binding agent, by means of appropriate dosing devices. 25 kg of a polyurethane-forming mixture, which advantageously is capable of foaming, is introduced into this mixing device, as a binding agent. The use of a foamed binder has been found to be particularly advantageous since the air and water can penetrate through the capillaries of the foamed binder so as to easily reach the nutritive material of the foamed flakes. Consequently, the ingredients present in the carrier body positively influence the growth of the plant, there being realized a particularly good aeration of the plant root and controlled delivery of the nutritive materials to the plant. The foamed binder therefore provides advantages beyond simply mechanically bonding the individual constituents, which could be simply achieved by using a non-foamed binder.

The flake mixture which emerges from the mixing device is filled into a suitable form and subjected to pressure, for example, by a press, as a result of which it reacts. To accelerate the reaction or to improve the formation of foam in the binding agent, the mixture which is subjected to pressure is exposed with advantage to a surge of steam.

When the carrier body has been removed from the mold, the finished foam body possesses, depending upon the desired degree of solidification, a volumetric weight or density of between 60 and 200 kg per m$^3$. After planting the seeds or plants in it, it can firstly be moistened with a suitable bacteria-containing solution, as a partial sterilization can occur through the surge of steam, so that the substances added to the foam flakes are decomposed more rapidly whereby the plants obtain the benefit of the nutrients more rapidly.

The planting is effected by forming a recess in the body by means of a punch or by burning, and introducing therein seeds, small stumps or young plants possibly with the aid of planting tongs. The plant carrier body described above displays a substantially better water retaining strength than other known synthetic substrates. In this context it should be noted that water poured from above is more easily absorbed whereas watering from below can only take place if the foam substance has been completely rooted through.

The more porous the carrier layer is, the better the commencing growth. For example, plants in a foam substance of a density of 60 kg/m$^3$ show within the first 4 weeks a 30% more rapid growth (weight of the green parts of the plant) than in a foam substance with a density of 90 kg/m$^3$. On the other hand, the solidity of the lighter material is less.

Under extremely unfavorable conditions experimental plants showed substantially less loss than with conventional substrates. This can be traced back in particular to the stronger air retention of the plant carrier layer described above. This carrier layer also can be treated with all fertilizer solutions conventional in the trade.

If the plants drawn into the carrier layer in accordance with the invention are to be transplanted or repotted it is desirable that the foam substance rots only slowly. This factor can be improved if at least a part of the foam flakes consist of soft polyesterurethane foam, or if an anti-rotting agent is added to the foam material.

If the foam substance possesses at least one, preferably perforated reinforcing layer, its bending strength and resistance to tearing is substantially increased. Strip or plate shaped foams of large dimensions can be thereby obtained, which can be used with advantage for the cultivation of waste land, for example, desert areas. The strips or plants can be planted, for example, in nursery gardens and be placed on the soil on planting. By means of the reinforcing layer a breakage during the rolling process which is necessary in production is avoided. This reinforcing layer can be, if, for example, it is arranged on the underside of the foam, designed to be watertight, in order to avoid the water flowing away, in particular in transfer to arid regions. On the other hand, it can also be designed to be perforated, in order to make possible a discharge of water in damp districts and to avoid decay of the plant roots.

Further, the foam can be provided with a reinforcing layer on the upper surface, which is penetrated by the sprouting plant. It can serve, for example, as protection against too intensive sun. Further reinforcing layers also can be provided.

The reinforcing layer can comprise a textile material, a synthetic foil or foam, the selection being made in accordance with the desired growth conditions for the plants, such as, for example, rooting through, water reservation, etc.

In order to secure the foam, which can be strip or plate shaped to the subsoil, the reinforcing layer can be joined to holding devices such as, for example, nails, rods or the like. However, other suitable securing devices can also be provided, for example, a grid can be placed over the foam, which grid is connected to the edges of the foam or through the foam, to the soil.

Besides a strip or plate shaped form, the foam can be designed in the form of a flower pot, or flower box. In this embodiment the reinforcing layer is used as the outer layer and this improves still further the solidity of the foam which itself is already very good. In order to also avoid an undesired appearance of water, the block of foam can be provided with a further coating on its side and/or on its underside. This coating can comprise a watertight or perforated synthetic foil or can be an ornamental or non-ornamental outer pot.

In the use of watertight coatings, between the foam substance and the coating, cavities can be provided for receiving nutrient solutions, fertilizers, water or the like. Foam blocks can be equipped, for example, with a water reservoir, whereby the plants do not need to be cared for over a larger period of time.

The coating can, however, also consist of a material which permits penetration of the plant roots. Later re-potting is thereby avoided, for example, in the planting out of young trees.

Flower pots and foam bodies can be produced with cavities. The foam material is formed with recesses in its surface. When this surface is covered with a coating, cavities are formed between the recesses and the coating. The foam body can exhibit an arbitrary profile of recesses on its surface, the depth of the recesses depending upon the size of the cavities to be produced. Subsequently, a foil is tautly stretched over the surface. The individual cavities, for example, can be joined to one another through channels or can be open towards the exterior, in order to simplify their filling with water or nutritive liquid.

BRIEF DESCRIPTION OF THE DRAWINGS

The invention will be better understood and objects other than those set forth above will become apparent when consideration is given to the following detailed description thereof. Such description makes reference to the annexed drawings, wherein.

DETAILED DESCRIPTION OF THE PREFERRED EMBODIMENTS

Figure 1:
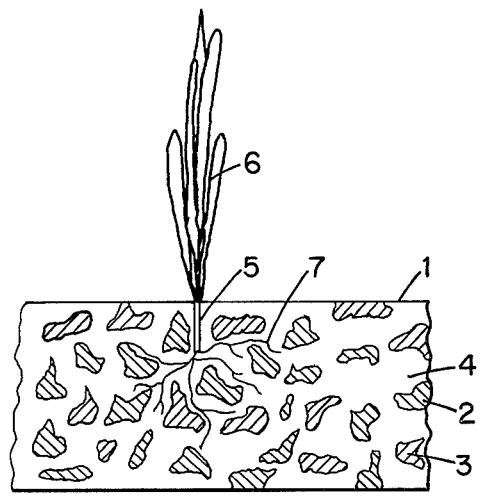
FIGS. 1 and 2 are respective sections through a plant foam carrier body produced in accordance with the teachings of this invention.

Referring now to the drawings, the carrier body 1 shown in FIG. 1 is shaped in the form of a plate and comprises foam flakes 2 having closed pores and foam flakes 3 having open pores. These flakes 2 and 3 are surrounded by a substance 4, which comprises peat litter, fertilizing agents or possibly decomposition accelerators and a binding agent. On its surface, the carrier body 1 possesses a recess 5, into which a plant 6 is inserted. From here the roots 7 of plant 6 grow into the foam.

Figure 2:
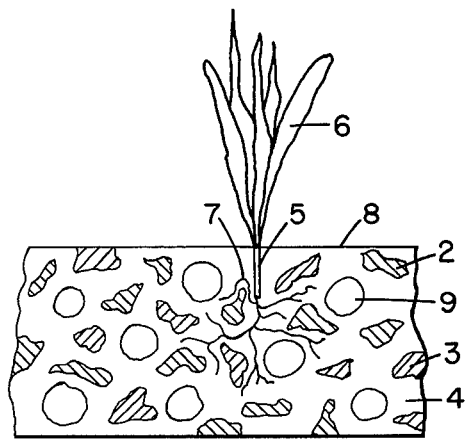

The carrier body 8 shown in FIG. 2 possesses, apart from the foam flakes 2 and 3 having closed and open pores respectively, also polystyrene foam particles 9, which are again surrounded by the above-described substance 4. In place of the recess 5, the foam can also be pierced by means of a pointed tool, whereby, instead of a young plant, plant seeds can be introduced, for example.

Figure 3:
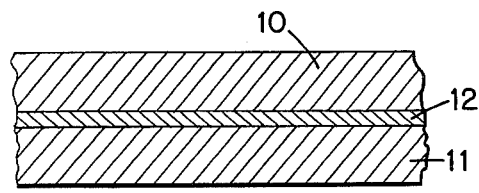
FIGS. 3 and 4 are respective sections through a plant foam carrier body produced in accordance with the teachings of the invention, and having a reinforcing layer or layers.

The carrier body shown in FIG. 3 comprises two foam layers 10 and 11, which are composed of the above-described mixture of foam flakes, peat litter, and fertilizing agents or the like. Between these two layers 10 and 11, a reinforcing layer 12 is arranged which either comprises a strip of textile material, such as jute cloth or the like, or a synthetic foil. The reinforcing layer 12 can be inserted between the layers 10 and 11 when the foam body is being manufactured, in which case the foam layers 10 and 11 are generally found to adhere well. The reinforcing layer 12, however, also can be inserted with the aid of a suitable adhesive. The reinforcing layer 12 should be designed, so that it can be penetrated by the plant roots and therefore may be perforated. The aim of the reinforcing layer is to avoid the foam tearing during transfer. In time the foam becomes sufficiently securely joined to the soil by means of the roots so that the reinforcing layer becomes superfluous. In order to avoid that the plant growth is influenced by the reinforcing layer, it is, however, expedient to provide it with a rotting agent, whereby it only acts as reinforcement of the foam until it has sufficient roots passing through it, which roots then take over the reinforcement.

Figure 4:
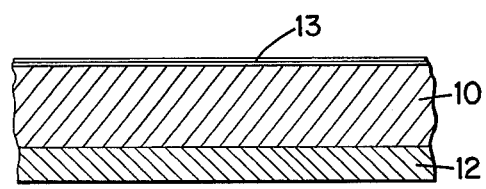

The carrier body shown in FIG. 4 comprises a layer 10 and a reinforcing layer 12 provided on the underside. This reinforcing layer consists of highly compressed foam material with greater solidity than that of the foam layer 10. The foam layer 10 is provided with a reinforcing layer 13 which acts as covering layer and can serve as protection against birds eating it, insulation or the like.

In place of a single reinforcing layer several reinforcing layers can also be provided, which are joined below one another by means of spacers or distance separators, and between which bulbs or the like can be embedded.

Figure 5:
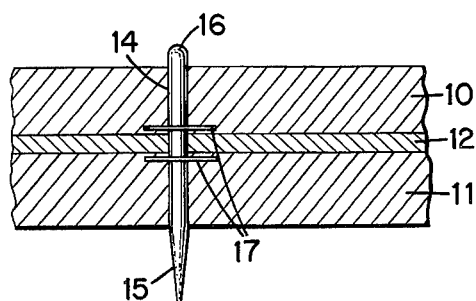
FIGS. 5 and 6 are respective sections through a plant foam carrier body produced in accordance with the teachings of the invention, and having a holding device.

The carrier body shown in FIG. 5 includes rod-shaped holding devices 14 at specific intervals, which project downwards in the form of a point 15 and upwards from the foam in the form of a dome 16. The holding devices 14 possess plates 17 in the region of the reinforcing layer 12, between which the reinforcing layer is held. When transferring the carrier body, the holding devices 14 can be easily planted in the soil. Damage to the foam by means of a planting tool does not occur as the domes 16 project above the foam. The holding devices also can be designed to be extended upwards, and can serve as bearing devices for glass plates or the like. In this manner very simple glass houses can be produced.

Figure 6:
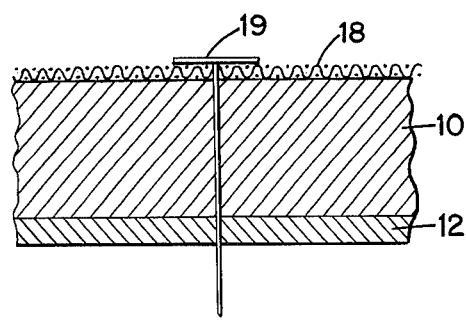

FIG. 6 shows a carrier body comprising a reinforcing layer 12 and a foam layer 10, over which a wire grid 18 is placed, which is secured to the ground by means of long, thin nails 19 which project through the foam joint.

Figure 7:
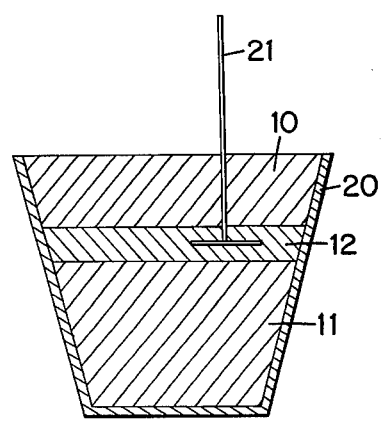
FIG. 7 is a sectional view through a flower pot produced in accordance with the invention.

The flower pot shown in FIG. 7 comprises the foam layers 10 and 11, between which the reinforcing layer 12 is arranged. The joint is surrounded by an external foil cover 20 which prevents water in the pot from flowing away. In place of the external foil cover 20 a conventional flower pot also can be provided. A rod 21 projecting upwards from the joint is coupled to the reinforcing layer 12, which rod serves as support for the plants.

Various physical characteristics of materials suitable for use as plant carrier body in accordance with the invention are given in the accompanying Table.

TABLE

| | Foam type | Pore size in mm. | % open pores | Water absorption or holding capacity (a=100) | Price/kg (a=100) | Price (a=100) | Decomposition | Insulation |
|---|---|---|---|---|---|---|---|---|
| a. | Polyetherurethane soft foam | 0.5 | 95 | 100 | 100 | 100 | difficult to rot | slight |
| b. | Polyetherurethane soft foam (hydrophil) | 0.5 | 85 | 110 | 120 | 120 | difficult to rot | poor |
| c. | Polyesterurethane soft foam | 0.3–1 | 60 | 120 | 150 | 150 | capable of rotting | slight |
| d. | Polyetherurethane hard foam | 0.2–0.5 | 3–5 | 2–5 | 160 | 160 | difficult to rot | very good |
| e. | Urea — formaldehyde resin foam | 0.2–0.3 | 60–70 | 120 | 100 | 40[x)] | capable of rotting | average |
| f. | Polystyrene foam | | | 0 | 70 | 40 | will not rot | very good |

[x)]The price rate relates to foam in block form. In the cases of urea formaldehyde resin foam, considerable difficulties or costs for drying are involved in industrial flake production.

In order to further clarify aspects of the invention tests were carried out using the following substrates:

I. Substrate (A) AGS 60
  1. Composition
    1.1 Basic mixture: 80.00 kg. polyurethane soft foam flakes (95% polyether foam soft foam flakes, 5% polyester soft foam flakes), flake size ≦ 10 millimeters.
       19.50 kg. Xylith
       0.07 kg. Horn meal
       0.08 kg. Urea
       0.25 kg. Calcium carbonate
       0.09 kg. Dicalcium phosphate
       0.01 kg. Trace elements in chelate form
    1.2 Foam mixture (binder)
       12.84 kg. Polyetherpolyol (average molecular weight about 4,000)
       5.00 kg. Toluyene diisocyanate (80% 2.4, 20% 2.6)
       2.49 kg. Ethyl acetate
       0.03 kg. Tin octoate
  2. Average pore size: 0.5 millimeters
  3. Percent open pores: 95
  4. Density: 60 kg/m$^3$ II. Substrate (B) AGS 50
  1. Composition: same as substrate A above
  2. Average pore size: 0.5 millimeters
  3. Percent open pores: 95
  4. Density: 50 kg/m$^3$ III. Substrate (C) AGS 250
  1. Composition: same as substrate A above
  2. Average pore size: 0.4 millimeters
  3. Percent open pores: 95
  4. Density: 250 kg/m$^3$ IV. Substrate (D) VBG 1
  1. Composition: same as substrate A above except
    1.1 Basic mixture: 80.00 kg. Polyurethane soft foam flakes, 80% closed pores (100% Polyetherpolyurethane), flake size about 10 millimeters
  2. Average pore size: 0.5 millimeter
  3. Percent open pores: 25
  4. Density: 80 kg/m$^3$ V. Substrate (E) VBG 2
  1. Composition: same as substrate A above except:
    1.1 Basic mixture: 80.00 kg. Polyurethane soft foam flakes, about 60% closed pores (100% Polyether-polyurethane), Flake size ≦ 10 millimeters.
  2. Average pore size: 0.5
  3. Percent open pores: 45
  4. Density: 70 kg/m$^3$ VI. Substrate (F) VBG 3
  1. Composition: same as substrate A above except:
    1.1 Basic mixture: 80.00 kg. Polyethylene foam granulate (100% closed pores),
  2. Average pore size: 0.5
  3. Percent open pores: 5
  4. Density: 60 kg/m$^3$ VII. Substrate (G) TKS
  Commercial peat substrate.

To carry out the tests, four plants were raised in the individual substrates A to G, namely chrysanthemum, peperomia, begonia, and gesnericaeae.

Evaluation was visually carried out, and four criteria were observed: root formation, rooting through, leaf growth, plant growth. In order to be able to classify the results of the visual inspection, five grades, ranging from 1 to 5, were given.

The results have been set forth in the following Tables 1 to 7:

TABLE 1

| Substrate A | Time | Root Formation | Rooting Through | Leaf Growth | Plant Growth |
|---|---|---|---|---|---|
| Plant | 2. Week | 1 | | | |
| Chrysanthemum Species Tokio | 3. Week | 1 | 1 | 1 | 1 |
|  | 4. Week | 1 | 1 | 2 | 1 |
| Plant | 2. Week | 1 | | | |
| Peperomia Serpens Scandens | 3. Week | 2 | 1 | 2 | 1 |
|  | 4. Week | 1 | 1 | 1 | 1 |
| Plant | 2. Week | 2 | | | |
| Begonia Semperflorens | 3. Week | 1 | 1 | 1 | 1 |
|  | 4. Week | 1 | 1 | 1 | 2 |
| Plant | 2. Week | 1 | | | |
| Gesneriaceae Episcia Cupreata | 3. Week | 1 | 2 | 2 | 1 |
|  | 4. Week | 1 | 1 | 1 | 1 |
| Average | | 1.17 | 1.12 | 1.07 | 1.12 |

1. Very good
2. Good
3. Satisfactory
4. Adequate
5. Not Adequate

TABLE 2

| Substrate B | Time | Root Formation | Rooting Through | Leaf Growth | Plant Growth |
|---|---|---|---|---|---|
| Plant | 2. Week | 2 | | | |
| Chrysanthemum species Tokio | 3. Week | 2 | 3 | 4 | 3 |
|  | 4. Week | 3 | 3 | 4 | 3 |
| Plant | 2. Week | 2 | | | |
| Peperomia Serpens Scandens | 3. Week | 3 | 2 | 4 | 2 |
|  | 4. Week | 3 | 3 | 3 | 3 |
| Plant | 2. Week | 2 | | | |
| Begonia Semperflorens | 3. Week | 4 | 4 | 4 | 4 |
|  | 4. Week | 3 | 3 | 4 | 3 |

TABLE 2-Continued

| Substrate B | Time | Root Formation | Rooting Through | Leaf Growth | Plant Growth |
|---|---|---|---|---|---|
| Plant | 2. Week | 3 | | | |
| Gesneriaceae | 3. Week | 2 | 2 | 3 | 3 |
| Episcia | 4. Week | 2 | 2 | 3 | 3 |
| Cupreata | | | | | |
| | Average | 2.58 | 2.75 | 3.62 | 3.14 |

1. Very Good
2. Good
3. Satisfactory
4. Adequate
5. Not adequate

TABLE 3

| Substrate C | Time | Root Formation | Rooting Through | Leaf Growth | Plant Growth |
|---|---|---|---|---|---|
| Plant | 2. Week | 4 | | | |
| Chrysanthemum | 3. Week | 4 | 4 | 4 | 4 |
| species Tokio | 4. Week | 3 | 3 | 3 | 3 |
| Plant | 2. Week | 3 | | | |
| Peperomia | 3. Week | 4 | 4 | 5 | 4 |
| Serpens | 4. Week | 4 | 4 | 4 | 4 |
| Scandens | | | | | |
| Plant | 2. Week | 4 | | | |
| Begonia | 3. Week | 4 | 4 | 4 | 4 |
| Semperflorens | 4. Week | 3 | 4 | 5 | 5 |
| Plant | 2. Week | 3 | | | |
| Gesneriaceae | 3. Week | 4 | 4 | 4 | 4 |
| Episcia | 4. Week | 4 | 4 | 5 | 4 |
| Cupreata | | | | | |
| | Average | 3.66 | 3.88 | 4.25 | 4.0 |

1. Very Good
2. Good
3. Satisfactory
4. Adequate
5. Not adequate

TABLE 4

| Substrate D. | Time | Root Formation | Rooting Through | Leaf Growth | Plant Growth |
|---|---|---|---|---|---|
| Plant | 2. Week | 5 | | | |
| Chrysanthemum | 3. Week | 4 | 3 | 4 | 5 |
| species Tokio | 4. Week | 3 | 4 | 4 | 4 |
| Plant | 2. Week | 4 | | | |
| Peperomia | 3. Week | 3 | 4 | 5 | 4 |
| Serpens | 4. Week | 4 | 4 | 5 | 5 |
| Scandens | | | | | |
| Plant | 2. Week | 3 | | | |
| Begonia | 3. Week | 3 | 4 | 4 | 4 |
| Semperflorens | 4. Week | 4 | 4 | 4 | 4 |
| Plant | 2. Week | 4 | | | |
| Gesneriaceae | 3. Week | 5 | 4 | 3 | 4 |
| Episcia | 4. Week | 5 | 4 | 4 | 3 |
| Cupreata | | | | | |
| | Average | 3.92 | 3.88 | 4.38 | 4.38 |

1. Very Good
2. Good
3. Satisfactory
4. Adequate
5. Not adequate

TABLE 5

| Substrate E | Time | Root Formation | Rooting Through | Leaf Growth | Plant Growth |
|---|---|---|---|---|---|
| Plant | 2. Week | 3 | | | |
| Chrysanthemum | 3. Week | 3 | 3 | 4 | 4 |
| species Tokio | 4. Week | 4 | 3 | 3 | 3 |

TABLE 5-Continued

| Substrate E | Time | Root Formation | Rooting Through | Leaf Growth | Plant Growth |
|---|---|---|---|---|---|
| Plant | 2. Week | 3 | | | |
| Peperomia | 3. Week | 4 | 3 | 4 | 4 |
| Serpens | 4. Week | 3 | 3 | 4 | 3 |
| Scandens | | | | | |
| Plant | 2. Week | 4 | | | |
| Begonia | 3. Week | 3 | 3 | 4 | 4 |
| Semperflorens | 4. Week | 3 | 4 | 3 | 3 |
| Plant | 2. Week | 4 | | | |
| Gesneriaceae | 3. Week | 4 | 4 | 3 | 4 |
| Episcia | 4. Week | 4 | 4 | 4 | 4 |
| Cupreata | | | | | |
| | Average | 3.50 | 3.38 | 3.63 | 3.63 |

1. Very Good
2. Good
3. Satisfactory
4. Adequate
5. Not Adequate

TABLE 6

| Substrate F | Time | Root Formation | Rooting Through | Leaf Growth | Plant Growth |
|---|---|---|---|---|---|
| Plant | 2. Week | 5 | | | |
| Chrysanthemum | 3. Week | 5 | 5 | 5 | 5 |
| species Tokio | 4. Week | 5 | 5 | 5 | 5 |
| Plant | 2. Week | 5 | | | |
| Peperomia | 3. Week | 4 | 5 | 4 | 5 |
| Serpens | 4. Week | 5 | 5 | 5 | 5 |
| Scandens | | | | | |
| Plant | 2. Week | 5 | | | |
| Begonia | 3. Week | 4 | 4 | 5 | 4 |
| Semperflorens | 4. Week | 4 | 5 | 4 | 5 |
| Plant | 2. Week | 5 | | | |
| Gesneriaceae | 3. Week | 4 | 5 | 5 | 5 |
| Episcia | 4. Week | 5 | 5 | 5 | 5 |
| Cupreata | | | | | |
| | Average | 4.67 | 4.88 | 4.75 | 4.88 |

1. Very Good
2. Good
3. Satisfactory
4. Adequate
5. Not Adequate

TABLE 7

| Substrate G | Time | Root Formation | Rooting Through | Leaf Growth | Plant Growth |
|---|---|---|---|---|---|
| Plant | 2. Week | 2 | | | |
| Chrysanthemum | 3. Week | 1 | 2 | 1 | 1 |
| species Tokio | 4. Week | 2 | 2 | 1 | 1 |
| Plant | 2. Week | 1 | | | |
| Peperomia | 3. Week | 2 | 1 | 1 | 1 |
| Serpens | 4. Week | 2 | 2 | 2 | 1 |
| SCandens | | | | | |
| Plant | 2. Week | 1 | | | |
| Begonia | 3. Week | 2 | 2 | 1 | 1 |
| Semperflorens | 4. Week | 1 | 2 | 1 | 2 |
| Plant | 2. Week | 2 | | | |
| Gesneriaceae | 3. Week | 2 | 2 | 1 | 1 |
| Episcia | 4. Week | 2 | 1 | 1 | 1 |
| Cupreata | | | | | |
| | Average | 1.67 | 1.95 | 1.12 | 1.12 |

1. Very Good
2. Good
3. Satisfactory
4. Adequate
5. Not Adequate

There will now be discussed the results on the basis of these Tables.

1. Dependency of the plant growth upon density: Substrates A, B, C:

There could be observed a clear decrease in all of the four observed components (root formation, rooting through, leaf growth, plant growth) both between substrate A and substrate B as well as between substrate A and substrate C. In this connection what is worthy of mention is especially the difference between the substrates A and B, since such are essentially of the same structure, there only existing a difference of 10 kg/m$^3$ in the density. The reason for this clear difference probably resides in the fact that a certain resistance during the root growth has a stimulating effect which is missing in the case of the substrate B, so that within the time period which was observed there already occurs considerable differences which are in favor of the density of 60 kg/m$^3$.

The substrate C with its density of 250 kg/m$^3$ is considerably poorer than the substrate B, wherein again in this case there could be determined that the greater density of such substrate has a hindering effect upon the root formation and also the leaf growth as well as the plant growth is extremely weak.

2. Dependency of the plant growth upon the percentage of open pores or cells in the substrate: Substrate A (95%), E (45%), D (25%), F (5%).

From the experiments it was clearly discernible that a higher percentage of closed pores has a disadvantageous effect upon the plant growth. Already with 45% open pores the root formation and the leaf growth are considerably poorer, and especially the leaf growth is very poor. This effect is further intensified so that with the substrate F, which only possesses 5% open pores, the plant growth within the observed time spans was practically nonexistent.

3. A comparison of the substrate A with a normal peat substrate (substrate F) showed slight advantages for the substrate A, such advantages primarily being present with respect to root formation, whereas the leaf growth and the general plant growth were equally good in both substrates.

Viewed in its totality the undertaken experiments have verified that with otherwise similar conditions (the same supply of nutrients, about the same pore or cell size of the foam flakes) the composition of substrate A was by far the most favorable. This substrate is manifested by the features that the major proportion of the foam flakes possess 95% open pores and there only was present 5% closed pores. Also a density of 60 kg/m$^3$ appears to constitute an optimum value, although the density may be in the order of 60 kg/m$^3$ and 200 kg/m$^3$. Finally, it appears that for best results the foam flakes should possess at least 80% open pores or cells.

While there is shown and described present preferred embodiments of the invention, it is to be distinctly understood that the invention is not limited thereto but may be otherwise variously embodied and practiced within the scope of the following claims.

Accordingly, what is claimed is:

1. A carrier body for a plant, comprising a mixture of foam flakes and nutritives, said foam flakes embodying foam flakes including at least 80% open pores, a foam binder of open cell configuration for binding together said foam flakes and nutritives to form a foamed body, said foam binder being water insoluble, said foamed body possessing a density value of between 60 and 200 kg per m$^3$.

2. The carrier body as defined in claim 1, wherein said foam flakes contain about 95% open pores.

3. The carrier body as defined in claim 1, wherein the foamed body has a density value of 60 kg per m$^3$.

4. A carrier body as defined in claim 1, further including filler materials.

5. A carrier body as defined in claim 1, wherein at least part of the foam flakes consist at least partially of polyesterurethane.

6. A carrier body as defined in claim 1, wherein said foam binder includes polyurethane.

7. A carrier body as defined in claim 1, further including at least one reinforcing layer.

8. A carrier body as defined in claim 7, wherein said reinforcing layer is perforated.

9. A carrier body as defined in claim 7, wherein the reinforcing layer is a textile material.

10. A carrier body as defined in claim 9, wherein said textile material is jute cloth.

11. A carrier body as defined in claim 7, wherein said reinforcing layer is a synthetic foil.

12. A carrier body as defined in claim 7, wherein said reinforcing layer contains foam possessing a higher degree of solidity than the other foam of the carrier body.

13. A carrier body as defined in claim 7, further including a rotting agent provided in said reinforcing layer.

14. A carrier body as defined in claim 7, further including a rotting agent.

15. A carrier body as defined in claim 7, further including holding devices provided for said reinforcing layer.

16. A carrier body as defined in claim 7, further including support means for the plants anchored to said reinforcing layer.

17. A method of making a carrier body comprising the steps of admixing foamed flakes of synthetic material and including at least 80% open pores together with nutritive substances, introducing a foaming water-insoluble synthetic material to said admixture in an amount and for a time to bind together the admixed particles, said foaming water-insoluble synthetic material defining a foam binder of open cell configuration, controlling the density of the foamed admixture so as to be in the order of between 60 and 200 kg per m$^3$, and cooling the foamed admixture.

18. The method as defined in claim 17, including the step of controlling the density to be in the order of 60 kg per m$^3$.

* * * * *